July 7, 1970     T. E. BAN     3,519,471

PROCESS FOR PRODUCING COATED LIME PRODUCT

Filed June 30, 1967

INVENTOR
THOMAS E. BAN

BY
Kramer & Sturges
ATTORNEYS

United States Patent Office
3,519,471
Patented July 7, 1970

3,519,471
PROCESS FOR PRODUCING COATED
LIME PRODUCT
Thomas E. Ban, Cleveland Heights, Ohio, assignor to McDowell-Wellman Engineering Company, a corporation of Ohio
Filed June 30, 1967, Ser. No. 650,458
Int. Cl. B44d 1/94
U.S. Cl. 117—100                1 Claim

ABSTRACT OF THE DISCLOSURE

A coated ferro-lime product is provided which is useful as a flux material, and comprising a core of lime and having a protective coating of ferruginous material surrounding said core. The product is produced by coating limestone rubble with iron oxide, or iron oxide-carbon mixtures, charging the coated limestone to a traveling grate, and exposing the particles to a hot gas draft that causes calcination and vitrification.

---

This invention relates, as indicated, to a novel fluxing material which is calcined limestone having a protective coating of vitrified iron oxide encasing the calcined limestone, which product is especially useful as a fluxing material in iron and steel making operations. These particles are produced by coating graded limestone rubble with an iron oxide-containing material, such as the fume which is recovered from basic oxygen furnaces (BOF), and charging such coated particles on a traveling grate to form a burden thereon. The burden is progressively heated by means of hot gases passed transversely through the burden on the traveling grate to raise the temperature of the burden to a point sufficient to calcify the limestone and vitrify the iron oxide coating to produce an impervious ferruginous, enamel-like coating on the particles.

Ferro-lime is a relatively new product of manufacture as prepared by the high-temperature reaction of iron oxide (iron ore) and calcium carbonate (limestone) which converts into iron oxide bonded with calcium oxide, otherwise known as calcium ferrites. This product is a flux for iron and steel making operations wherein the iron oxide constituent tends to lower the melting point of the flux yielding calcium oxide available as a strong basic constituent for chemically combining with or attenuating and forming a slag with acidic constituents such as phosphorus pentoxide, silica dioxide and aluminum oxide. Ferro-lime is ordinarily produced by reacting mixed powdered ingredients of iron oxide and calcium carbonate which are composed in the form of sinter or pellets as a rather uniform mass of compounds and solid solutions of iron oxide and calcium oxide.

The coated ferro-lime product as described herein consists of white calcined limestone particles which are completely coated with a vitrified black layer of iron oxide. This is produced by high-temperature firing of limestone particles which are precoated with iron oxide fines. This causes the limestone to become converted into lime (CaO). The iron oxide diffuse into and reacts with the surface of the limestone and forms a dense black impervious enamel-like coating of fused iron oxide-calcium oxide material which acts as a protective coating. This coating prevents attrition and degradation of the lime, and it also prevents moisture and carbon dioxide in the atmosphere from hydrating and carbonating the lime. These phenomena of weathering tend to degrade the chemical and physical properties of lime and thus impair its utility in iron and steel making operations.

The production of ferro-lime, as such, has long been known and pacticed, the earliest procedures involving the mixing of crushed limestone and iron ore and sintering the mass to yield "dead burnt lime." More recent refinements of this process involve the crushing of limestone to relatively small particle size, e.g., all minus ⅛", mixing with iron ore, adding moisture, with or without added carbon, pelletizing the moist mass to form discreet pellets of relatively uniform particle size, followed by charging to a traveling grate to form a burden thereon, and exposure to temperatures sufficient to cause an interaction between the iron oxide and the limestone to produce a fluxing material useful in iron and steel making operations. These more refined processes are disclosed in U.S. Pat Nos. 3,311,465 and 3,313,617. The system represented by these two patents have been found to be beneficial in utilizing low-cost limestone which is available in abundant quantities as fines composed of minus ⅛ inch screenings up to and including minus 100 mesh dust. These processes also utilize low-cost iron oxide fines that are relatively free of objectionable element such as sulphur or zinc.

It has now been found that when limestone is available as rubble-like structure approximately 1 inch by ⅛ inch as produced by crushing and grading operations, a coated ferro-lime product can be made without the crushing-grinding and nodulizing or poling operations that are normally required for the aforementioned sintering and pelletizing processes. Typically, limesone rubble is a gravel-like graded material frequently used for railroad ballast in which the particles average about ¾" size. Coated ferro-lime in accordance herewith is made by coating fine, powdered iron oxide particles on the surfaces of graded rubble structured limestone particles. This coating may be applied by spraying iron oxide slurry upon the limestone particles or tumbling the particles while spray is being applied. Alternatively, wetted limestone particles may be tumbled with dry or damp iron oxide fines thereby causing the fines to adhere to the limestone particles. Still further, a combination of these procedures can be used to obtain varying amounts of iron oxide coating. For instance, ratios on the order of 10% by weight iron oxide can be acquired by spraying 65% iron oxide-water slurry on the limestone particles. If it is desired to increase the amount of iron oxide "picked up" by the limestone, the spray-coated particles may then be rerolled in a suitable rolling apparatus such as an inclined rotating rerolling pan or disc to apply damp or even dry iron ore fines to the spray-coated particles. The "pick-up" usually ranges from about 5% to 18% by weight of the limestone.

After the particles are coated, the damp, granular charge is fed to a traveling grate machine, preferably a horizontally-moving traveling grate machine, as a relatively thin layer where it is heated by hot draft gases to a point sufficient to effect calcination and vitrification of the components. The particles discharged from the traveling grate machine are iron oxide-coated lime particles which are useful as flux in iron and steel making operations.

The invention may be better understood by having reference to the annexed drawings wherein.

Briefly stated, the present invention is in a ferro-lime flux material useful in iron and steel making operations comprising a core of calcined limestone having an encapsulating coating of vitrified iron oxide thereon. The process of producing such products comprises the steps of adhering to the exterior surfaces of rubble limestone a coating of finely-divided iron oxide and an aqueous binder, charging the coated limestone rubble particles to a traveling grate machine in a relatively thin layer, i.e. from 4 to 18 inches deep, progressively heating the coated limestone rubble particles to a temperature sufficient to calcify at least a portion of the limestone and sufficient to vitrify the iron oxide coating to form a hard enamel-like continuous coating about the particle, and discharging the ferro-lime product from the traveling grate. A typical depth of the burden is 12".

Figure 1:
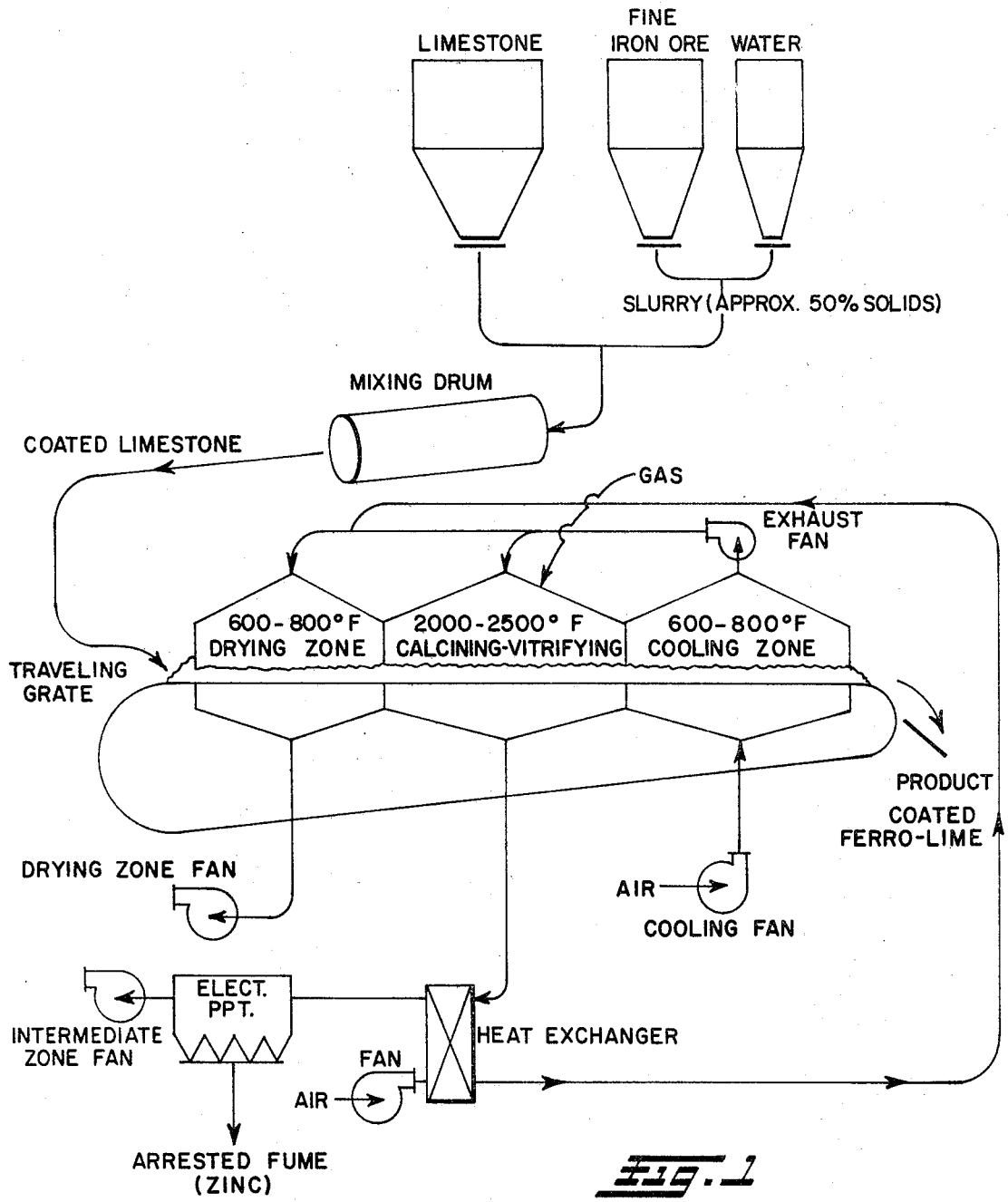
FIG. 1 is a flow-sheet illustrating an embodiment of the process of the present invention.
Figure 2:
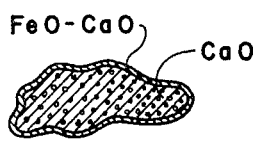
FIG. 2 is a cross section of a ferro-lime product produced in accordance herewith showing a vitrified coating of iron oxide-limestone reaction product as a protective coating surrounding an inner core of calcined limestone, or lime.

Referring now more particularly to FIG. 1 which is a flow sheet illustrative of an embodiment of the process of this invention, there is shown in diagrammatic form supply vessels for rubble limestone, iron oxide, such as BOF fume, and water. The latter two of these ingredients are mixed together to form a slurry of approximately 50% solids. Suspension aids may be included at this point, although such have been found to be unnecessary. The rubble limestone in measured amount is conveyed to a mixing drum as is the slurry where they are tumbled together and there issues therefrom a coated limestone material having iron oxide adhered to the outer surface thereof. With BOF fume this material has the characteristic rust-brown color of iron oxide. The weight ratio of limestone rubble to iron oxide dust in a typical example is 88:12, and the moisture content is about 5% by weight. A typical limestone rubble analyzes 53.0% CaO; 1.09% MgO; 1.19% $SiO_2$; 0.73% $Al_2O_3$; 0.93% $Fe_{Total}$; loss on ignition 42.95%. The screen analysis is $-\frac{5}{8}''+\frac{1}{2}''$, 63.6%; $-\frac{1}{2}''+\frac{3}{8}''$, 26.4%; $-\frac{3}{8}''+\frac{1}{4}''$, 10.0%. A typical iron oxide dust (BOF) analyzes $Fe_{Total}$ 59.87%; $Fe^{++}$ 23.57%; carbon 0.68%; loss on ignition 3.19%; and 90% is finer than 325 mesh.

The coated limestone rubble is conveyed by any suitable means to a traveling grate machine to form a burden thereon, for example 5" deep. Such a machine may be of conventional construction. One such machine includes a plurality of pallets having upstanding sidewalls held in spaced relation by grate bars forming the bottom of the pallet. These pallets are mounted on wheels which in turn are supported on trackways and are driven in contiguous relation along a horizontal trackway passing between supported hoods and windboxes disposed beneath. The hoods are provided with suitable venting means as illustrated diagrammatically in the drawing to permit the introduction of hot gaseous medium. The undersupported windboxes are also provided with suitable ducting means fed with fans for moving the gases transversely through the burden in a predetermined direction.

As illustrated in the drawing, the burden is first exposed to hot gases at a relatively low temperature of from about 600° F. to about 800° F. which are passed downwardly through the burden to effect a drying of the coating on the limestone rubble particles. These gases are drawn downwardly through the burden by means of a drying fan and exhausted to the atmosphere. The rate of gas flow is in the range of from 150 to 300 standard cubic feet per minute per square foot of grate area (s.c.f.m.). A suitable rate in this zone is 200 s.c.f.m. The residence time of any segment of the burden in the drying zone is generally from about 2 to about 6 minutes. A typical retention time is 4 minutes.

The dried particles leave the drying zone and enter a calcining-vitrifying zone where they are contacted with gases which have a temperature in the range of from about 2000° F. to about 2500° F. These gases are passed downwardly through the burden by means of an intermediate zone fan which exhausts the gases exiting from the intermediate zone to the atmosphere after passing them through a heat exchanger and an electrostatic precipitator. Heat is supplied to the gases transversing the intermediate zone by means of a gas torch within the intermediate zone hood.

The rate of gas flow in the intermediate zone is also generally in the range of from 150 to 300 s.c.f.m. with a typical rate being 200 s.c.f.m. The residence time in the intermediate zone for any segment of the burden is in the range of from 15 to 30 minutes. A typical residence time is 20 minutes.

In order to conserve heat, ambient air driven by means of a cooling fan is forced upwardly through the burden where it abstracts the heat therefrom and provides a heated gas affluent driven by means of an exhaust fan through a conduit leading to both the drying zone and the intermediate zone. The gases exiting from the cooling zone have a temperature usually in the range from about 600° F. to about 800° F. and thus provides a suitable medium for effecting initial drying of the coated limestone particles. A portion of the gases passing through the drying zone are fresh ambient air gases which have become heated by passing through a heat exchanger whereby heat from the intermediate zone gases is exchanged with the incoming fresh air. Such incoming fresh air also supplies a portion of the gases which are passed through the intermediate zone. The rate of gas flow through the burden in the cooling zone is generally in the range of from 250 to 500 s.c.f.m., a typical rate being 300 s.c.f.m. The residence time in the cooling zone is generally from about 4 to 8 minutes, 5 minutes being a typical period of time.

After the coated ferro-lime product is cooled, it is recovered from the exit end of the traveling grate machine. A product produced in accordance herewith utilizing the specific conditions set forth above analyzed $Fe_{Total}$ 13.5%; CaO 80.0% and $CO_2$ 0.5%. The size analysis showed particles of $+\frac{5}{8}''$, 37.8%; $-\frac{5}{8}''+\frac{1}{2}''$, 30.5%; $-\frac{1}{2}''+\frac{3}{8}''$, 22.2%; $-\frac{3}{8}''+\frac{1}{4}''$, 8.2%; and $-\frac{1}{4}''$, 1.3%. Although drying and cooling zones are utilized in the preferred embodiment of this invention, either or both zones may be eliminated. In a preferred embodiment of traveling grate apparatus used herewith, the grates move continuously along a closed path and residence time in a given zone is controlled by the distance allotted to such zone. Either a circular traveling grate machine, for example the type shown in U.S. Pat. No. 3,302,936 dated Feb. 7, 1967, or a straight line traveling grate with looped return ends such as schematically shown in FIG. 1 may be used. Devices providing intermittant stationary positioning of the grates in a given zone may also be used.

As indicated above, one embodiment of this invention utilizes BOF fume. Under the conditions of the present invention, zinc is released from such fume and is conveniently recovered by means of the electrostatic precipitator. Where such volatilized metals are not present in the exit gases, the electrostatic precipitator equipment is not required.

As indicated above, waste steel plant fume, such as the fine dust arrested from basic oxygen converter processes (BOF fume), generally contains objectionable elements such as sulphur and zinc which occur in the fume from sublimation of volatile constituents in steel making operations. These materials impose a penalty on the rich iron oxide fume which contains approximately 60% iron calculated as the metal. If this fume is recycled to a sintering operation and used as blast furnace feed, the residual zinc condenses within the furnace and causes severe crusting and refractory decomposition. If high sulphur quantities are contained within the fume, these ordinarily enter the metallic iron and contribute to very poor metallurgical properties of the iron and steel made therefrom. In order to reuse profitably the high iron oxide fume in the iron and steel plant systems, it is necessary to recycle the material in an agglomerated state, and it is necessary to remove zinc and sulphur, together with other volatile impurities, so that these do not cause the aforementioned metallurgical problems.

BOF fume as a low-cost source of iron oxide can be adequately recovered and reutilized in ferro-lime processes in general if, during the processes, sulphur and zinc are removed. Ordinarily, when these constituents are intermixed with fine limestone, they become chemically "fused" to the calcium oxide and are removed only with great difficulty. However, if the BOF fume is incorporated on the surfaces of limestone particles, the temperature and chemical conditions are ideal for decomposition and removal of these objectionable materials. Within the packed bed or burden on the traveling grate machine, the high-temperature oxidizing draft can readily transfer heat and high temperatures to the surfaces of the limestone particles. The endothermal calcining reactions do not interfere with or tend to quench this high-temperature zone at the surface of the particles thereby transferring with the iron oxide-lime reaction. It has also been found that carbon can be appropriately mixed with the iron oxide to the extent of from 1% to about 10% by weight thereof to aid in causing extensive volatilization of the zinc by high-temperature reducing reactions which evolve metallic zinc from the surfaces of the particles. The environment of the sulphur and zinc within the iron oxide fume is such that it is free of lime which ordinarily tends to act as a fixing agent. Therefore, removal of these constituents during the firing operation is enhanced.

FIG. 1 illustrates the application of an electrostatic precipitator within the draft line exiting from the high-temperature intermediate zone. This precipitator enables the recovery of fumed materials, such as zinc, as valuable by-products. FIG. 1 also illustrates the use of an indirect heat exchanger which enables a high-temperature oxidizing draft of air to be recuperated to the system free of fumed objectionable materials.

What is claimed is:

1. The process of producing a coated ferro-lime product, which product includes a core of calcined limestone and an encapsulating coating of vitrified iron oxide, which process includes the steps of:

(a) adhering a coating of raw finely divided iron oxide and a binder consisting of water onto the exterior surface of limestone rubble;
(b) charging the coated limestone rubble onto a traveling grate to form a burden layer having a thickness of from 2 to 12 inches;
(c) exposing the burden layer to hot oxidizing gases passed transversely therethrough at a temperature of from 2000° F. to 2500° F. for a period of time sufficient to calcine the limestone to lime, and vitrify the iron oxide on the surface thereof to form an encapsulating coating about the calcified limestone rubble.

References Cited

UNITED STATES PATENTS

| 2,001,448 | 5/1935 | Beasley | 117—118 X |
| 2,103,249 | 12/1937 | Eells | 117—100 |
| 2,281,167 | 4/1942 | Nichols | 117—118 X |
| 3,098,158 | 7/1963 | Sullivan | 117—23 X |
| 2,806,776 | 9/1957 | Veale et al. | 117—100 X |

FOREIGN PATENTS 200,612   12/1954   Australia.

WILLIAM D. MARTIN, Primary Examiner

M. R. P. PERRONE, Jr., Assistant Examiner

U.S. Cl. X.R.

75—94; 117—118, 169